US009538036B2

(12) United States Patent
Hall

(10) Patent No.: US 9,538,036 B2
(45) Date of Patent: Jan. 3, 2017

(54) SCAN AREA INDICATION

(75) Inventor: Jeffrey D. Hall, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2431 days.

(21) Appl. No.: 11/669,116

(22) Filed: Jan. 30, 2007

(65) Prior Publication Data

US 2008/0180758 A1    Jul. 31, 2008

(51) Int. Cl.
H04N 1/04    (2006.01)
H04N 1/42    (2006.01)
H04N 1/10    (2006.01)
H04N 1/193   (2006.01)

(52) U.S. Cl.
CPC .............. *H04N 1/10* (2013.01); *H04N 1/1013* (2013.01); *H04N 1/193* (2013.01); *H04N 2201/0452* (2013.01)

(58) Field of Classification Search
USPC . 358/474, 486, 488, 497, 494; 382/172–180
See application file for complete search history.

(56) References Cited

U.S. PATENT DOCUMENTS

| | | | |
|---|---|---|---|
| 2,179,164 A | 11/1939 | Sabel | |
| 3,848,996 A | 11/1974 | Goding | |
| 3,899,245 A | 8/1975 | Bernhardt | |
| 4,244,649 A | 1/1981 | Rees et al. | |
| 4,498,762 A | 2/1985 | Uehara et al. | |
| 4,666,288 A * | 5/1987 | Watanabe | 399/183 |
| 5,883,728 A * | 3/1999 | Kow | 358/494 |
| 5,986,774 A * | 11/1999 | Han | 358/487 |
| 6,057,944 A * | 5/2000 | Takeuchi | 358/468 |
| 6,463,220 B1 | 10/2002 | Dance et al. | |
| 6,516,151 B2 | 2/2003 | Pilu | |
| 6,608,297 B2 * | 8/2003 | Neukermans et al. | 250/208.1 |
| 7,545,543 B2 * | 6/2009 | Herloski et al. | 358/475 |
| 7,715,066 B2 * | 5/2010 | Michiie | 358/474 |
| 2003/0038227 A1 * | 2/2003 | Sesek et al. | 250/208.1 |
| 2005/0207675 A1 * | 9/2005 | Fuchigami et al. | 382/298 |
| 2006/0103877 A1 * | 5/2006 | Lee et al. | 358/1.15 |

* cited by examiner

*Primary Examiner* — Benny Q Tieu
*Assistant Examiner* — Sunil Chacko
(74) *Attorney, Agent, or Firm* — HP Inc. Patent Department

(57) ABSTRACT

Various embodiments and methods relating to a scan area indicator are disclosed.

6 Claims, 6 Drawing Sheets

SCAN AREA INDICATION

BACKGROUND

Flatbed scanners are sometimes used to make differently scaled copies of portions of one or more original documents. Appropriately positioning the document(s) on the scanner bed to scan the correct portion(s) of the document(s) may be difficult.

DETAILED DESCRIPTION OF THE EXAMPLE EMBODIMENTS

Figure 1:
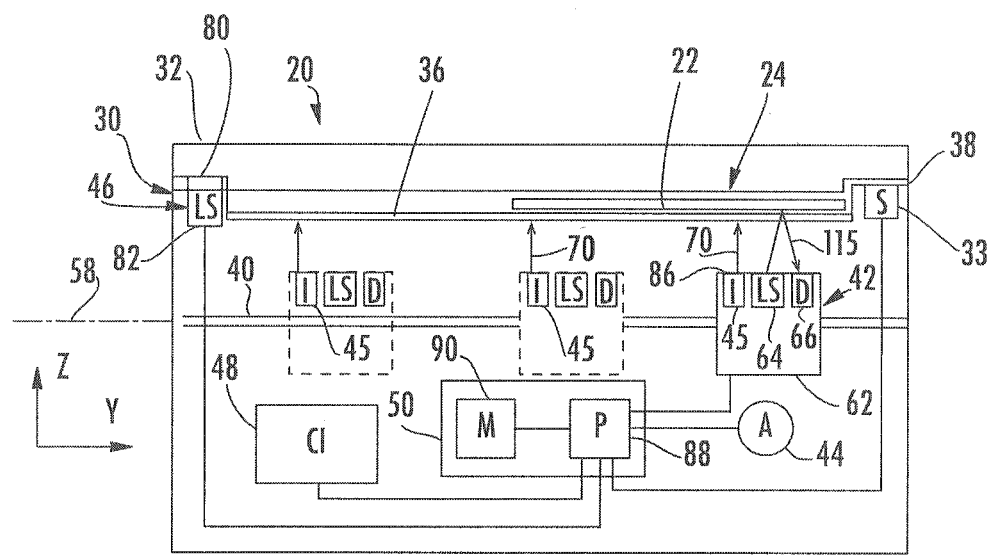
FIG. 1 is a sectional view schematically illustrating a scanner according to an example embodiment.
Figure 2:
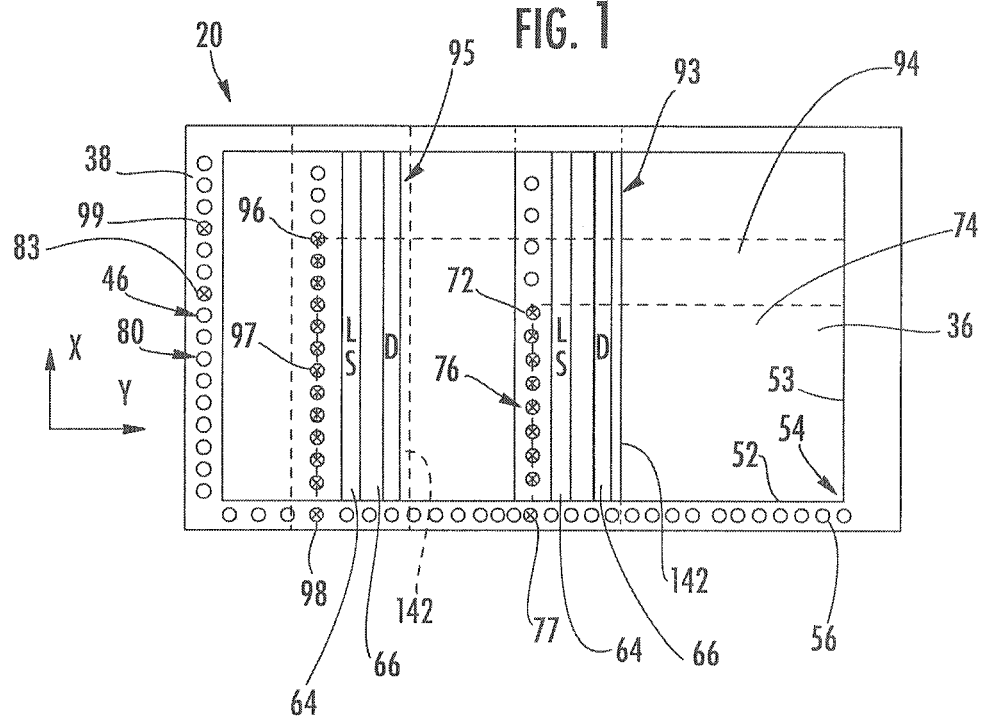
FIG. 2 is a top plan view of portions of the scanner of FIG. 1 according to an example embodiment.

FIGS. 1 and 2 schematically illustrate scanner 20 according to one example embodiment. FIG. 1 is a sectional view of scanner 20 in a closed state. FIG. 2 illustrates a top of scanner 20 in an open and document receiving state. Scanner 20 is configured to scan or capture information (one or more images) upon a face 22 of a document 24. As will be described in more detail hereafter, based upon a current or selected scaling value for a forthcoming scan of document 24, scanner 20 indicates a scan area to assist in proper positioning of document 24.

For purposes of this disclosure, the term "scan area" refers to an actual area of face 22 which will be captured by scanner unit 42 and either copied onto another medium or stored as an electronic document. Dimensions of the scan area will vary depending upon a selected scaling. For example, if images (text, graphics, photos and the like) of document 24 are to be enlarged (a scaling of greater than 100%), a smaller portion of the original document 24 will be scanned. Likewise, if images on document 24 are to be reduced, a greater portion of document 24 will be scanned. In certain circumstances, the area being scanned may be greater than the entire area of document 24.

Scanner 20 provides a visual cue to a person as to how to properly position document 24 on scanner 20. This visual cue facilitates proper positioning of document 24 on scanner 20 by a person such that appropriate portions of document 24 are scanned and enlarged or reduced. This visual cue may further assist a person in fully utilizing available space in the scaled copy of document 24. For example, in the case of a reduction, the scan area may be larger than document 24. In certain circumstances, this additional excess scanning area may be used to scan additional information from additional documents positioned adjacent to document 24 for scanning.

Scanner 20 includes scanner bed 30, lid 32 and sensor 33. Scanner bed 30 contains scanner elements and is configured to support document 24. Scanner bed 30 includes platen 36, platen frame 38, guide 40, scanner unit 42, actuator 44, scan area indicator 45, scan area indicator 46, command interface 48, and controller 50. Platen 36 comprises a structure, and configured to support document 24 while light, such as visible light, is transmitted through platen 36. Platen 36 serves as a window through which images or information from document 24 are captured. Platen 36 is formed from a transparent material, such as glass or a transparent polymer. In the particular embodiment illustrated, platen 36 provides a generally horizontal surface upon which document 24 may rest as it is being scanned. In other embodiments, platen 36 may alternatively be supported in a vertical or inclined orientation.

Platen frame 38 comprises a bezel structure and projecting above the platen 36 adjacent to platen 36. Platen frame 38 is configured to indicate to a person proper placement of a document upon platen 36. In particular, platen frame 38 forms a pair of raised surfaces 52, 53 which extend substantially perpendicular to one another so as to form an origin corner 54 adjacent to platen 36 against which a corner of a document to be scanned may be positioned for image capture.

In the particular example illustrated, platen frame 38 continuously extends about and surrounds platen 36 and projects above platen 36 to mate with lid 32 so as to inhibit entry of stray or environmental light onto platen 36. In other embodiments, platen frame 38 may alternatively extend just in corner 54 rather than entirely about platen 36. In still other embodiments, platen frame 38 may include a plurality of spaced projecting tabs or other surfaces extending about platen 36 at selected locations about platen 36. Although platen frame 38 is illustrated as being generally rectangular, in other embodiments, platen frame 38 may be square or have other shapes.

As shown in FIG. 2, platen frame 38 includes windows 56. Windows 56 extend through platen frame 38 along at least one side of platen 36 in the Y-axis direction. Windows 56 transmit light. In one embodiment windows 56 may include one or more overlaying light transmitting materials which may or may not be color filters. In another embodiment, windows 56 may be devoid of any materials. As illustrated in FIG. 2, windows 56 are spaced along the platen 36. As will be described in detail hereafter, windows 56 permit scanner 20 to operate in one scan area indicating mode in which light is transmitted through windows 56 to indicate a dimension of a scan area. In embodiments where this particular mode is not provided, windows 56 may be omitted.

Guide 40 comprises one or more structures configured to guide movement of scanner unit 42 along an axis 58 relative to platen 36. In one embodiment, guide 40 comprises an elongate substantially rigid rod, wherein scanner unit 42 slides along the rod. In another embodiment, guide 40 may comprise one of a grooved or channel and a projection, wherein scanner unit 42 includes the other of the channel in the projection, facilitating sliding of scanner unit 42 along guide 40. In other embodiments, other structures may be employed for movably supporting scanner unit 42.

Scanner unit 42 comprises a component or element configured to capture or sense images (text, graphics and the like), upon a face of a sheet of media through platen 36. Scanner unit 42 includes scanner carriage 62, light source 64 and detector 66. Scanner carriage 62 comprises one or more structures forming a body which is movably supported along guide 40. Carriage 62 is further configured to support and carry detector 66 and light source 64 during movement relative to platen 36.

Light source 64 comprises one or more sources of light and associated optics, if any, configured to direct light on to face 22 of document 24. In one embodiment, light source 64 includes a lamp. In another embodiment, light source 64 may comprise other sources for emitting and directing visible light.

Detector 66 comprises one or more sensing devices and associated optics which are configured to sense light emitted by light source 64 and reflected off face 22. Such light reflected off of face 22 of document 24 will vary depending upon printing, text or other images upon face 22. Detector 66 senses such variations in light and generates electrical signals which represent the variations in light and the images upon face 22. These electrical signals are transmitted to processor 88 and used by processor 88 to form an electronic image or copy of the image upon face 22.

As shown by FIG. 2, in one embodiment, scanner unit 42 extends substantially across platen 36 in the X-axis direction. In such an embodiment, each of carriage 62, a light source 64 and detector 66 span platen 36 in the X-axis direction. In the particular embodiment illustrated, scanner unit 42 additionally extends beyond platen 36 and at least portions of platen frame 38 as indicated in FIG. 2. In other embodiments, scanner unit 42 may have other lengths. Scanner unit 42 may be configured to capture images from face 22 in a single pass across document 24 in the Y-axis direction or in multiple passes.

Actuator 44 comprises a mechanism configured to linearly move scanner unit 42 along an axis 58. In particular, actuator 44 translates scanner unit 42 across platen 36 so as to scan images from document 24. In one embodiment, actuator 44 includes a motor (not shown) which drives the belt (not shown) that is secured to scanner unit 42. In other embodiments, actuator 44 may comprise other devices for translating scanner unit 42.

Scan area indicator 45 comprises an indicator that is carried by carriage 62 of scanner unit 42 and that is configured to indicate to a person at least one dimension of a determined scan area of an upcoming scan of document 24. In the example embodiment illustrated, indicator 45 comprises another light source distinct from light source 64 and configured to direct light in the direction indicated by arrow 70. In the particular embodiment illustrated, indicator 45 is configured to operate in three distinct scan area indicating modes: (1) a spot mode, (2) a line mode and (3) a window mode. In other embodiments, indicator 45 may alternatively operate in one or two of the noted modes or in additional modes.

FIG. 2 illustrates an example scan area 74 based upon a particular selected scaling of the document 24 being scanned. FIG. 2 further illustrates indicator 45 operating in each of the three modes. In the first spot mode, indicator 45 directs light upon platen 36 so as to form a single spot 72 of light upon platen 36. Spot 72 is located at or adjacent to a corner of scan area 74. The X-axis position of spot 72 is attained by appropriately positioning carriage 62 in the X-axis direction with actuator 44. The Y-axis position of spot 72 is attained by either selectively actuating one of a plurality of light emitting elements arranged in a row or by moving a light emitting element or optics associated with the light emitting element. For example, in one embodiment, indicator 45 may include a light emitting diode (not shown) supported upon a movable support (not shown), wherein the support is moved by an actuator such as a voice coil (not shown). Even though such movement may be small, the displacement of spot 72 resulting from such movement may be increased through appropriate optics.

In the second line mode, the same spot 72 is formed. However, in addition, indicator 45 further forms a continuous or broken line 76 of light extending from spot 72 in the X-axis direction. As in the spot mode, spot 72, now located at a terminal point of line 76, indicates both a length and a width of scan area 74. Line 76 provides a more visible indication for the leftward most boundary or edge of scan area 74 as seen FIG. 2. Line 76 may be formed by appropriately focusing or modifying light from a single light emitting element so as to form a line of light, by rapidly moving a point of light to form a line or by actuating a plurality of distinct light emitting elements arranged in a row or line.

In the third window mode, indicator 45 directs light through one of windows 56. The particular window 56 through which light is transmitted is selected by appropriately positioning carriage 62 in the Y-axis direction. The particular window 56 through which light is transmitted corresponds to the leftward most edge or boundary of scan area 74 in the Y-axis direction. In the example illustrated in FIG. 2, the Y-axis dimension of scan area 74 is indicated by the transmission of light through the particular window 77. In this third window mode, the top or upper bound or edge of scan area 74 is indicated by indicator 46.

Because scan area indicator 45 is carried by scanner carriage 62 of scanner unit 42, indicator 45 may be moved with carriage 62 to a position to indicate at least one dimension of the scan area. As a result, the scan area may be indicated using the same actuator 44 which is used to move scanner unit 42 during scanning. A separate actuator for moving scan area indicator 45 to indicate different scan area dimensions with different selected scaling may be omitted. Thus, the scan area indication feature may be provided at a reduced cost and without substantially increasing complexity of scanner 20.

Although scan area indicator 45 is illustrated as utilizing light from one or more light emitting elements distinct from light source 64 to indicate a scan area prior to scanning, in other embodiments, indicator 45 may alternatively be configured to utilize light provided by light source 64 through the use of appropriate optics channeling and directing such light to form a distinct illumination on platen 36. In yet other embodiments, scan area indicator 45 may alternatively comprise a visible mark, shape or other visual cue formed upon, mounted to or otherwise carried by scanner carriage 62. For example, scanner carriage 62 may alternatively include a visible mark or groove along a surface 86 that faces platen 36 and which is sufficiently large so as to be visible through platen 36. In some embodiments, this visible mark or groove may be used in combination with one or more light sources indicate one or more dimensions of the scan area.

Indicator 46 cooperates with indicator 45 in the third mode to indicate the length and width dimensions of a scan area, such as scan area 74. In particular, indicator 46 indicates a dimension of the scan area in the X-axis direction. In the example illustrated, indicator 46 includes windows 80 and light sources 82. Windows 80 comprise openings through platen frame 38 and extend along platen frame 38 in the X-axis direction. In one embodiment, windows 80 may include a light transmitting material. In another embodiment, windows 80 may be devoid of any material. In particular embodiments, windows 80 may alternatively comprise an elongated single opening or windows 80 may be omitted.

Light sources 82 comprise one or more light emitting elements disposed below platen frame 38. Light sources 82 are configured to be selectively lit so as to indicate a dimension of a scan area in the X-axis direction. In the example illustrated in FIG. 2, the X-axis dimension of scan area 74 is indicated by lighting the particular light source 82 opposite to window 83. In one embodiment, each of windows 80 between window 83 extending up to window 83 may additionally be lit. In one embodiment, light sources 82 they comprise a plurality of light emitting diodes. In other embodiments, other light emitting elements may be employed. In embodiments where scanner 20 does not include the third mode or merely indicates a dimension of the scan area in the Y-axis direction, indicator 46 may be omitted.

Command interface 48 comprises an interface for scanner 20 by which externally originating instructions or commands may be provided to controller 50. In one embodiment, command interface 48 is configured to permit input of commands from a person operating scanner 20. For example, in one embodiment, interface 48 may comprise a keyboard, keypad, touchpad, touch screen, mouse, button, switch, slide, lever or microphone with the appropriate voice recognition or speech recognition software. In other embodiments, interface 48 may be configured to permit input of control signals from an external electronic device such as an external computer or from a network or an internet connected to other external electronic devices.

Controller 50 comprises one or more processing units 88 and associated memories 90 configured to generate control signals directing the operation of actuator 44 and scanner unit 42. In the particular embodiment illustrated, controller 50 further generates an electronic image using information from document 24 that is captured by unit 42. In one embodiment, controller 50 further controls scanner unit 42 such that the image captured from a document, such as document 24, is scaled (i.e., an enlarged or reduced). For purposes of this application, the term "processing unit" shall mean a presently developed or future developed processing unit that executes sequences of instructions contained in a memory, for example, memory 90. Execution of the sequences of instructions causes the processing unit to perform steps such as generating control signals and processing data. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, processor 88 may be embodied as part of one or more application-specific integrated circuits (ASICs). Unless otherwise specifically noted, the controller is not limited to any specific combination of hardware circuitry and software, nor to any particular source for the instructions executed by the processing unit.

Memory 90 comprises a form of persistent storage configured to store and contain instructions for processor 88. Memory 90 is further configured to at least temporarily store digital or electronic files representing images sensed from the one or more sheets of media. In other embodiments, memory 90 may alternatively simply contain instructions for processor 88, wherein captured images are stored on other memory.

Lid 32 comprises a covering configured to extend over and across platen 36 to inhibit entry of the stray or environmental light during scanning. In particular embodiments, lid 32 may include additional component such as input or output trays and document feeders. In one embodiment, lid 32 is hinged to bed 30. In other embodiments, lid 32 may be movably connected to bed 30 in other fashions.

Sensor 33 comprises a sensing device configured to detect whether lid 32 is in an open or closed state with respect to bed 30. Based upon such signals from sensor 33 indicating whether lid 32 is opened or closed, controller 50 may initiate generation of control signals causing the dimensions of a scan area to be indicated. In other embodiments, controller 50 may additionally or alternatively be configured to initiate the indication of such scan areas in response to a scan area indication command received via command interface 48. Although sensor 33 is illustrated as being incorporated into bed 30, in other embodiments, sensor 33 may alternatively be incorporated into lid 32. In yet other embodiments, sensor 33 may be omitted.

Figure 3:
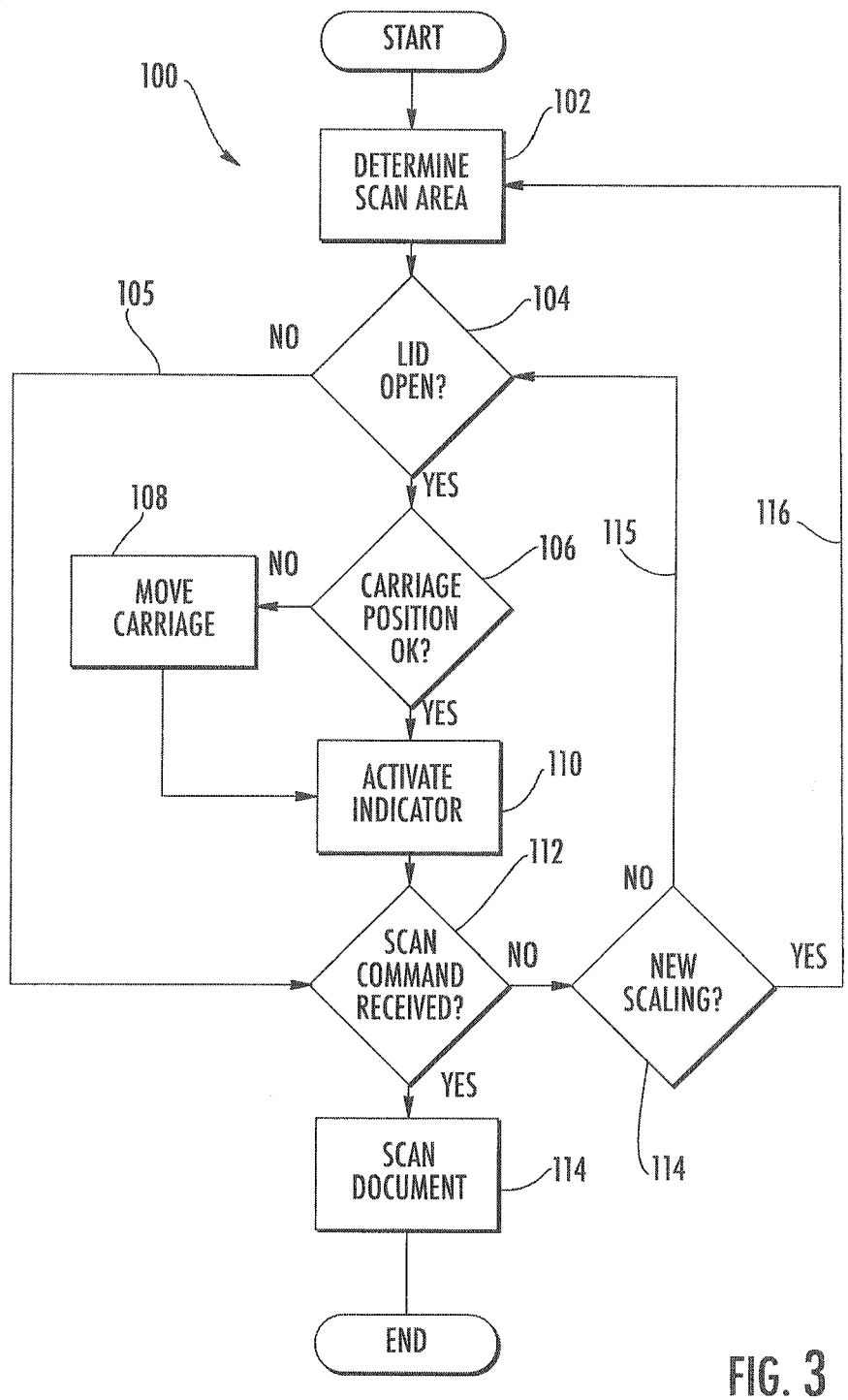
FIG. 3 is a flow diagram illustrating a scanning method according to an example embodiment.

FIG. 3 is a flow diagram illustrating one example of a method 100 by which scanner 20 may operate. As indicated by step 102, upon powering a scanner 20, controller 50 determines a current scan area based upon a current selected scaling value. Such a value may constitute a previously entered scaling value or may constitute a default scaling value. Such a value may be 100%, maybe an enlargement (greater than 100%) or maybe a reduction (less than 100%). FIG. 2 illustrates one example scan area 74.

As indicated by step 104, controller 50 determines whether lid 32 is opened or closed. In the embodied illustrated, controller 50 determines the state of lid 32 based upon signals received from sensor 33. As indicated by arrow 105, if the lid is closed, method 100 proceeds directly to step 112.

As indicated by step 106, if lid 32 is open, controller 50 generates control signals such that the scan area is indicated. In particular, controller 50 determines whether carriage 62 is appropriately position with respect to platen 36 such that indicator 45 will indicate the dimension of scan area 74 in the Y-axis direction. As indicated by step 108, if carriage 62 is not properly positioned, controller 50 generates control signals causing actuator 44 to move carriage 62 of scanner unit 42. In the example illustrated in FIG. 2, carriage 62 is moved to position 93 shown in FIG. 2.

As indicated by step 110, once carriage 62 is properly positioned along axis 58, controller 50 generates control signals causing indicator 45 to indicate at least one dimension of the determined scan area 74. Such control signals will be based at least in part upon a selected indication mode. This indication mode may comprise a default indication mode or may comprise a selected indication mode received via command interface 48. As noted above, if the spot indication mode is selected, controller 50 generates control signals causing a single spot 72 (shown in FIG. 2) to be illuminated upon platen 36, wherein the same spot indicates a corner of scan area 74. If the line indication mode is selected, controller 50 generates control signals causing spot 72 to be formed and additionally causing line 76 to be illuminated upon platen 36. If the window mode is selected, controller 50 generates control signals causing indicator 43 to direct light through an opposite one of windows 56 and platen frame 38. At the same time, controller 50 may generate control signals causing a selected one of a plurality of light sources 82 to direct light through one or more windows 80. In some embodiments, the windows mode may be performed concurrently with either the spot mode or the line mode. In yet other embodiments, the window mode may not be available.

As indicated by step 112, controller 50 determines whether a scan command has been received via command interface 48. As indicated by step 114, if a scan command has received, the one or more document resting upon platen 36 are scanned using the current or existing scaling value. In particular, controller 50 generates control signals such that scanner unit 42 is moved across his sufficient extent of document 24 in the Y-axis direction. As scanning unit 42 is being moved across document 24, controller 50 generates control signals directing light source 64 to emit light towards document 24 and directing sensor 66 to receive and sense such reflected light as schematically illustrated by arrow 115 (shown in FIG. 1).

As indicated by step 114, if a scan command has not been received, controller 50 determines whether a new scaling value has been entered via command interface 48. As indicated by arrow 115, if a new scaling value has not been received, process steps 104-112 are repeated such that indication of the present scan area is continued. As indicated by arrow 116, if a new scaling value has been received, steps 102-112 are repeated using a new determined scan area per step 102.

FIG. 2 illustrates such a scenario where a user inputs a new scaling value via command interface 48. In step 102, controller 50 determines the new scan area 94. In the particular example illustrated, the scaling value is reduced. As a result, scan area 94 is larger than scan area 74. In response to lid 32 being opened, as determined by controller 50 in step 104, controller 50 determines whether carriage 62 is a properly positioned based upon the new scan area 94. If not, controller 50 generates control signals causing actuator 44 to move scanner unit 42 to position 95 shown in FIG. 2. As indicated in step 110 and FIG. 3, controller 50 proceeds with generating control signals such that indicator 43 indicates dimensions of the new scan area 94 using one or more of the selected indication modes.

In the example illustrated, in the spot mode, controller 50 generates control signals such that indicator 43 forms illumination spot 96 instead of illumination spot 72. In the line mode, controller 50 further generates control signals causing line 97 to be formed instead of line 76. In the window indication mode, controller 50 causes windows 98 and 99 to be illuminated instead of windows 77 and 83, respectively. Per steps 112 and 114, once a scan command is received via command interface 48, controller 50 generates control signals causing scanner unit 42 to scan the document and form an electronic or physical copy using the new scaling value.

Figure 4:
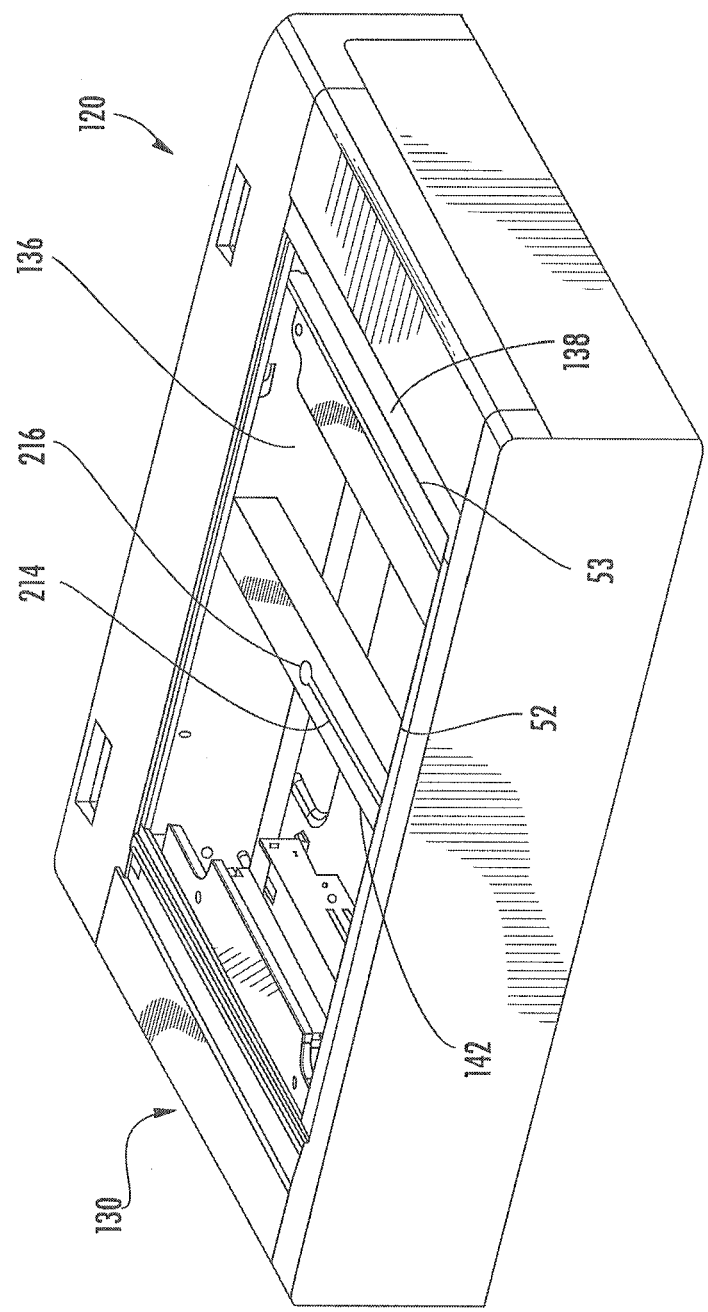
FIG. 4 is a top perspective view of portions of another embodiment of the scanner of FIG. 1 according to an example embodiment.
Figure 5:
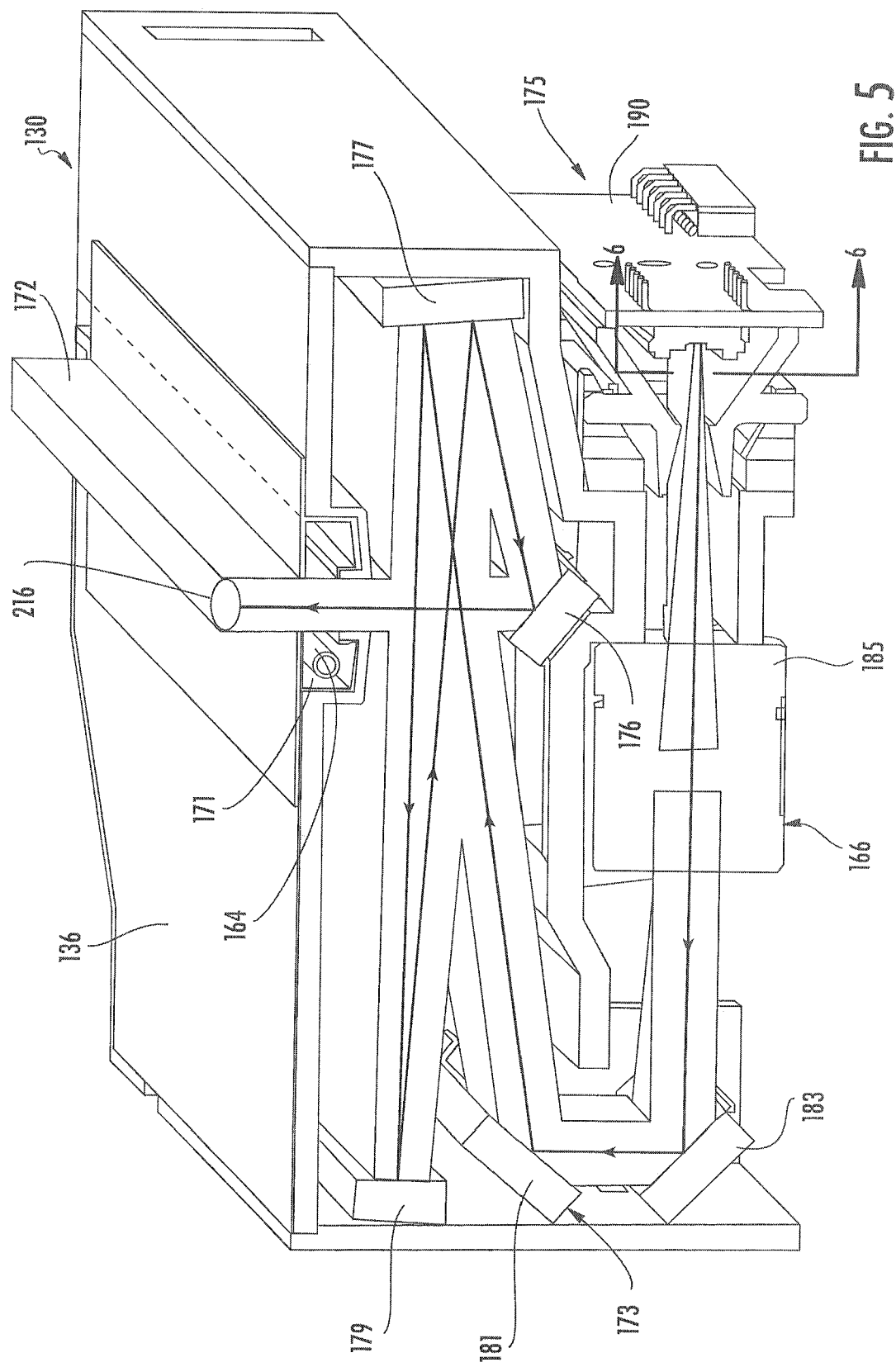
FIG. 5 is a sectional view of a scanner unit and the scan area indicator of the scanner of FIG. 4 according to an example embodiment.
Figure 6:
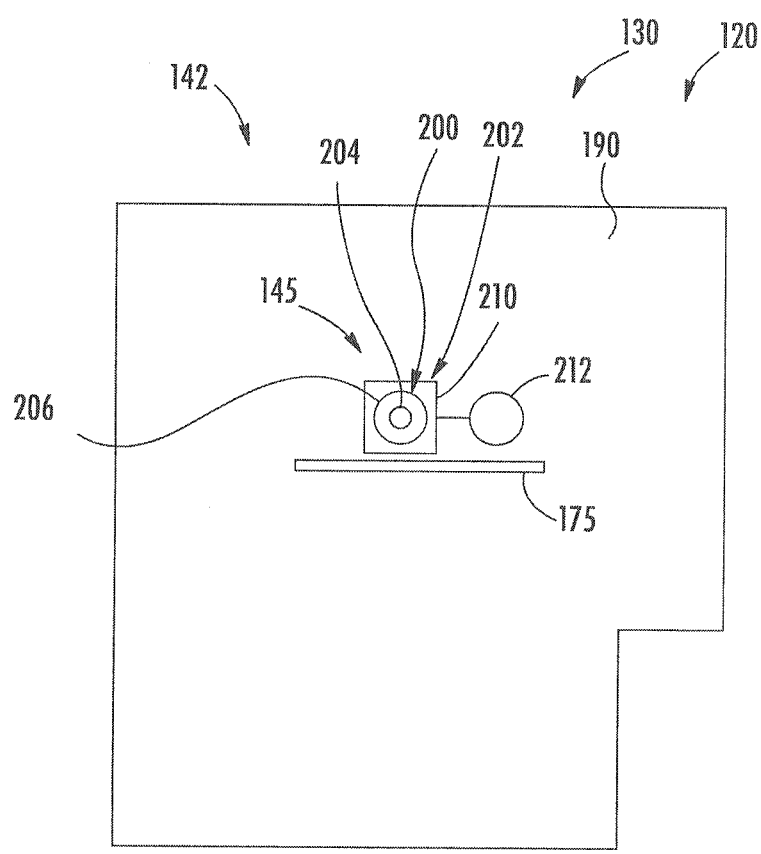
FIG. 6 is an end view of the scanner unit of FIG. 6 taken along line 6-6 with portions schematically illustrated according to an example embodiment.

FIGS. 4-6 illustrate scanner 120, another embodiment of scanner 20. Scanner 120 includes bed 130, lid 32 and sensor 33. Lid 32 and sensor 33 are illustrated and described above with respect to scanner 20. Scanner bed 130 supports a document to be scanned and contains components of scanner 120. Scanner bed 130 includes, platen 136, platen frame 138, guide 40, scanner unit 142, actuator 44, scan area indicator 145 (shown in FIG. 6), command interface 48, and controller 50. Guide 40, actuator 44, command interface 48, and controller 50 are schematically illustrated and described above with respect to scanner 20 in FIGS. 1 and 2.

Platen 136 and platen frame 138 are shown in FIG. 4. Platen 136 is similar to housing platen 36 described above with respect to scanner 20. Platen frame 138 is similar to platen frame 38 except that platen frame 138 omits windows 56. In embodiments where scanner 120 is configured to provide the windows mode as described above, platen frame 138 may additionally include such windows 56 (shown in FIG. 2). For ease of illustration, those components of platen 136 and platen frame 138 which correspond to components of platen 36 and platen frame 38, respectively, are numbered similarly.

Scanner unit 142 and scan area indicator 145 are shown in FIG. 5 which is a sectional view through scanner unit 142. Scanner unit 142 includes carriage 162, a light source 164 and detector 166. Carriage 162 comprises a body or framework movably supported along guide 40 (shown in FIG. 1) and configured to support and carry light source 164 and detector 166. Carriage 162 further supports and carries scan area indicator 145. As shown by FIG. 5, carriage 162 has a width extending in the Y-axis direction and an elongated length extending in the X-axis direction. Carriage 162 includes an opening 171 extending in the X-axis direction. Opening 171 forms a cavity for receiving a mounting light source 164. Opening 171 further permits light emitted by light source 164 and reflected off of one or more document resting upon platen 136 (shown in FIG. 4) to pass through and be directed by detector 166. In other embodiments, carriage 162 may have other configurations.

Light source 164 comprises a device configured to emit light in an upward direction towards platen 136 in FIG. 4. Light source 164 is configured direct light across substantially an entire X-axis dimension of platen 136. In the embodiment illustrated, light source 164 comprises a visible light emitting lamp. In other embodiments, light source 164 may comprise one or more other light emitting elements.

Detector 166 is configured to receive light reflected from a document resting upon platen 136 through opening 171 of carriage 162 and to generate electrical signals based upon the reflected light. Detector 166 includes optics 173 and sensor 175. Optics 173 comprise a variety of optical elements (mirrors or lenses) configured to modify and direct reflected light so to a properly focus the reflected light upon sensor 175 (shown in FIG. 6). Optics 173 forms a light path 172 which extends from opening 171 to sensor 175. In the example illustrated, optics 173 includes mirrors 176, 177, 179, 181 and 183, and lens 185. In other embodiments, light path 172 may have other configurations and may be formed from additional or alternative optical elements.

FIG. 6 is a view taken along line 6-6 of FIG. 5 and schematically illustrates sensor 175. Sensor 175 receives reflected light transmitted along light path 172 and generates electrical signals representing characteristics of the reflected light. Such signals are used by controller 50 (shown in FIG. 1) to form a scaled copy of at least portions of the document resting upon platen 136 (shown in FIG. 4). In the particular example illustrated, sensor 175 includes a circuit board 190 which supports one or more charge coupled devices configured to be impinged by the reflected light and to generate different electrical signals based upon characteristics of the reflected light. In other embodiments, sensor 175 may comprise other forms of light sensing devices.

Scan area indicator 145 comprises a device configured to visibly indicate to a person at least one dimension of a scan area based upon a selected scaling value. In the particular example illustrated, scan area indicator 145 is configured to indicate both a width and a length of the scan area. In the particular example illustrated, scan area indicator 145 is configured to illuminate selected defined portions of platen 136 to indicate the scan area, wherein the illuminated portions have relatively short or defined edges or boundaries discernible from unlit portions of platen 136.

In the particular example illustrated, scan area indicator 145 includes light source 200 and actuator 202. Light source 200 is configured to emit a generally non-diffuse visible light in a selected direction. In the example illustrated, light source 200 includes light emitting diode 204 and a light pipe 206. In other embodiments, light source 200 may include more than one light emitting diode may include other optics for directing such light.

Actuator 202 is configured to move light source 200 to a sufficient degree or distance so as to appropriately position the illuminated spot or line upon platen 136 to indicate various scan areas corresponding to various selected scaling values. In the particular embodiments illustrated, actuator 202 includes a movably supported platform or base 210 and a drive member 12. Base 210 comprises a platform supporting light source 200. Base 210 is movably coupled to board 190 by one or more flexible legs (not shown).

Drive member 212 comprises a mechanism configured to move base 210 which also results in movement of a light source 200. In one embodiment, drive member 212 comprises a voice coil. In one embodiment, drive member 212 is configured to move base 210 and hold base 210 at various selected stationary positions which correspond to various stationary locations of the illuminated spot upon platen 136 corresponding to a quarter of a scan area. In another embodiment, drive member 212 may be configured to reciprocate base 210 at relatively high frequency such that light source 200 illuminate the visible line upon platen 136 representing a boundary of the scan area. In other embodiments, other mechanisms may be used for moving light source 200.

Because scan area indicator 145 is provided by relatively few components and is mounted upon an existing circuit board 190 and because indicator 145 utilizes the existing optics of detector 166, scanner 120 may be modified to additionally include a scan area indicator 145 without adding substantial complexity or cost. In other embodiments, scan area indicator 145 they alternatively use other optics and maybe mounted on other structures.

As shown in FIG. 4, once the scan area has been determined based upon a selected scaling value, actuator 44 (shown in FIG. 1) moves scanning unit 142 to an appropriate position opposite the platen 136. Controller 50 (shown in FIG. 1) generates control signals causing light source 200 (shown in FIG. 6) to emit light. Controller 50 further generates control signals causing drive member 212 to move and position base 210 such that the light from light source 200 is appropriately directed along light path 172 as shown in FIG. 5 to form and appropriately located illumination 214 on platen 136. In the example shown in FIG. 4, illumination 214 comprises a line having a terminal end or spot 216 corresponding to a corner of the scan area. In other embodiments, scan area indicator 145 may alternatively be configured to form illumination spot 216 without the rest of line 214. Like scanner 20, scanner 120 may, in some embodiments, operate according to the method 100 shown and described with respect to FIG. 3.

Figure 7:
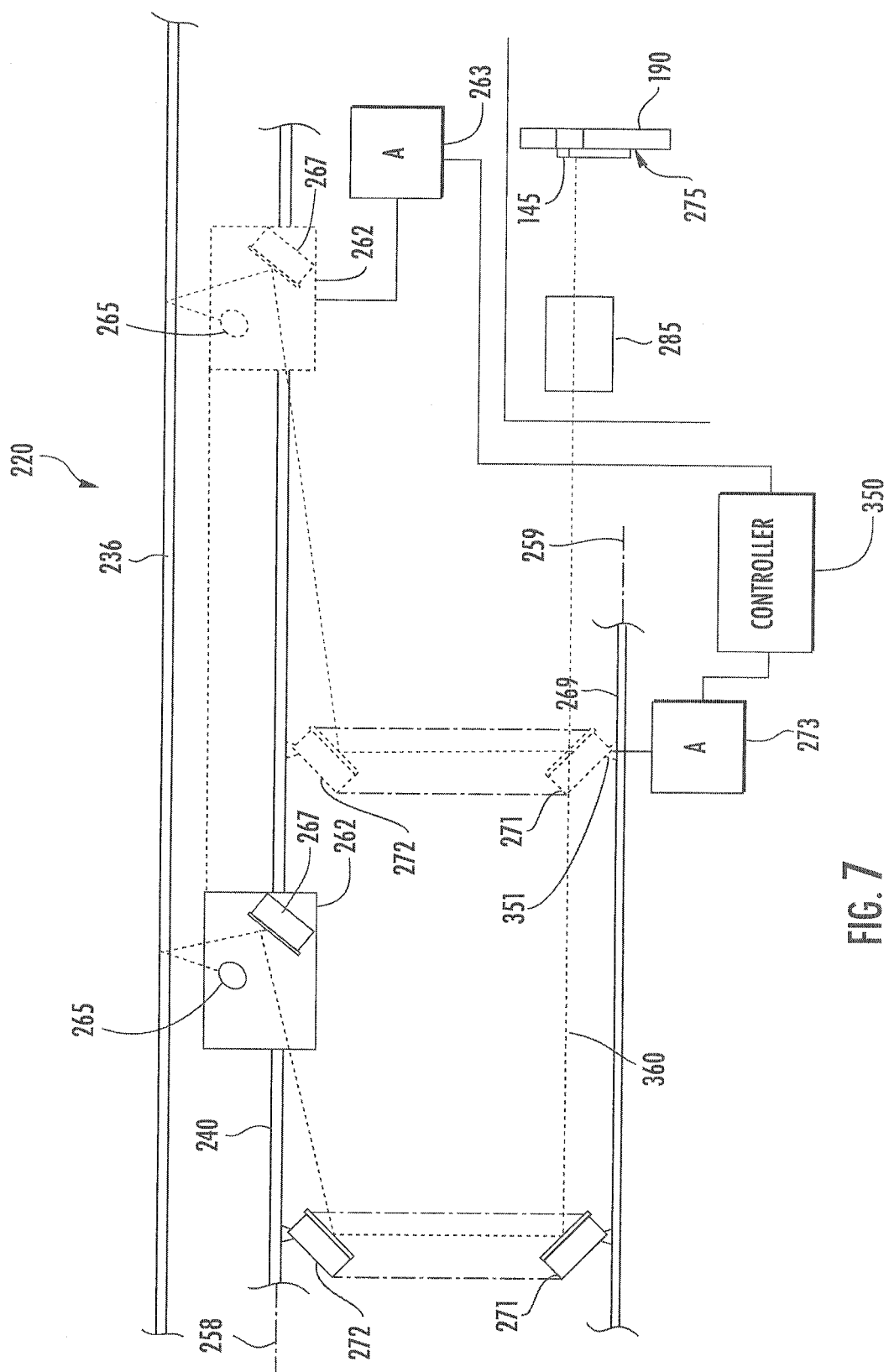
FIG. 7 is a sectional view schematically illustrating another embodiment of the scanner of FIG. 1 according to an example embodiment.

FIG. 7 schematically illustrates scanner 220, another embodiment of scanner 20. Like scanners 20 and 120, scanner 220 moves a carriage to reposition a visible indication of at least one dimension of a scan area provided by a scan area indicator. However, in scanner 220, the scan area indicator is not carried by the carriage. Rather, the positioning of the visible indication provided by the scan area indicator is moved by moving the carriage which moves a mirror that is carried by the carriage and that reflects the visible indication onto the platen.

As shown by FIG. 7, scanner 220 includes platen 136, guide 240, carriage 262, actuator 263, light source 264, mirror 267, guide 269, mirrors 271 and 272, actuator 273, lens 285 sensor 275, scan area indicator 145 and controller 350. Platen 136 is described above with respect to scanner 120. The platen 136 comprises a transparent panel configured to support documents as they are being scanned.

Guide 240 is similar to guide 40. Guide 240 is configured to guide movement of the carriage 262 opposite to and across platen 236 during scanning. As noted above, in one embodiment, guide 240 may comprise a rod along which carriage 262 slides. In other embodiments, guide 240 may comprise one of a grooved or channel and a projection, wherein carriage 262 includes the other of the channel in the projection, facilitating sliding of carriage 262 along guide 240. In other embodiments, other structures may be employed for movably supporting carriage 262.

Carriage 262 comprises one or more structures configured to carry light source 265 and mirror 267 opposite to and across platen 236. Carriage 262 is movably supported by guide 240. Carriage 262 may have a variety of different sizes, shapes and configurations.

Actuator 263 comprises a mechanism configured to linearly move carriage 262 along an axis 258. In particular, actuator 263 translates carriage 262 across platen 236 so as to move light source 265 and mirror 267 to scan images from a document. In one embodiment, actuator 263 includes a motor (not shown) which drives the belt (not shown) that is secured to carriage 262. In other embodiments, actuator 263 may comprise other devices for translating carriage 262.

Light source 264 is similar to light source 64 (shown and described with respect to FIG. 1). Light source 264 comprises one or more sources of light and associated optics, if any, configured to direct light on to face of a document resting upon platen 236. In one embodiment, light source 264 includes a lamp. In another embodiment, light source 264 may comprise other sources for omitting and directing visible light.

Mirror 267 is coupled to and carried by carriage 262. As shown with the broken lines 360 representing the visible light path, mirror 267 is configured to cooperate with mirror 271 to focus light reflected from a document resting upon platen 236 on to detector 266. In the embodiment illustrated, mirror 267 is further configured to reflect a visible indication of at least one dimension of a scan area provided by scan area indicator 145 onto platen 236.

Guide 269 comprises one or more structures configured to guide linear movement or translation of mirror 271 along an axis 259. Axis 259 extends substantially parallel to axis 258. In one embodiment, guide 269 may comprise a rod along which mirror 271, and a supporting structure 351 slide. In other embodiments, guide 269 may have other configurations. In still other embodiments, guide 269 may be omitted where movement of mirror 271 is also guided along guide 240.

Mirrors 271 and 272 are configured to cooperate with mirror 267 to direct light reflected from a document resting upon platen 236 towards detector 266 along light path 360. In addition, mirrors 271 and 272 are configured to reflect and direct the visible indication provided by scan area indicator 145 onto platen 236.

Actuator 273 comprise a mechanism configured to linearly translate mirrors 271 and 272 along guide 261 and along axis 259. In one embodiment, actuator 273 includes a motor (not shown) which drives the belt (not shown) that is secured to mirrors 271 and 272. In other embodiments, actuator 273 may comprise other devices for translating mirrors 271 and 272. To maintain proper focusing of light onto detector 266, mirrors 271 and 272 are moved at a different speed and a different extent as compared to movement of carriage 262 and mirror 267. For example, in one embodiment, actuator 273 may be configured to move mirrors 271 and 272 at approximately one half the speed at which mirror 267 is moved by actuator 263 during scanning. In other embodiments, this speed difference may vary. Although scanner 220 is shown as including two such mirrors 271 and 272, in other embodiments, scanner 220 may include a single mirror in place of mirrors 271 and 272 or greater than two such mirrors.

Although scanner 220 is illustrated as including distinct actuators 263 and 273 for moving carriage 262 and mirror 271, respectively, in other embodiments, linear translation of carriage 262 and mirror 271 may alternatively be performed with a single actuator. For example, in one embodiment, single actuator may be operably coupled to carriage 262 and mirror 271 by separate drive trains, such as distinct gear trains, which results in carriage 262 and mirror 271 being driven at distinct proportional speeds.

Lens 285 comprises a lens configured to focus light reflected from mirror 271 onto detector 266. Likewise, lens 285 further transmits the visible indication of a scan area provided by scan area indicator 145 onto mirror 271. In other embodiments, other optical components may be used in lieu of lens 285.

Sensor 275 is similar to sensor 175 of scanner 120 except that sensor 275 is not carried by a carriage but is stationarily supported by a housing or frame of scanner 220. Sensor 275 receives reflected light transmitted along light path 360 and generates electrical signals representing characteristics of the reflected light. Such signals are used by controller 350 to form a scaled copy of at least portions of the document resting upon platen 236 In the particular example illustrated, sensor 275 includes circuit board 190 which supports one or more charge coupled devices configured to be impinged by the reflected light and to generate different electrical signals based upon characteristics of the reflected light. In other embodiments, sensor 275 may comprise other forms of light sensing devices.

Scan area indicator 145 is supported upon circuit board 190 and is substantially similar to scan area indicator 145 of scanner 120 as shown in FIG. 6. Controller 350 comprises one or more processing units configure to generate control signals directing actuators 263 and 273 to coordinate movement of carriage numeral to 62 and mirror 271 during scanning. In particular embodiments, controller 350 may further generate control signals directing operation of detector 275 and scan area indicator 145. In particular embodiments, controller 350 may additionally manipulate data signals received from sensor or 275 to form an electronic image of the scanned document.

In operation, once the scan area has been determined based upon a selected scaling value prior to scanning, actuators 263 and 273 move carriage 262 and mirror 271 to an appropriate position opposite the platen 136. Controller 350 generates control signals causing light source 200 (shown in FIG. 6) to emit light. Controller 350 further generates control signals causing drive member 212 to move and position base 210 such that the light from light source 200 is appropriately directed along light path in the 360 as shown in FIG. 5 to form and appropriately located illumination or visible indication on platen 136 indicating at least one dimension of the determined scan area. In one embodiment comes as visible indication may comprise an illuminated spot. In another embodiment, the visible indication may comprise an illuminated line. Like scanner 20, scanner 220 may, in some embodiments, operate according to the method 100 shown and described with respect to FIG. 3

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a command interface configured to receive externally originating instructions including a selected scaling value;
   a controller configured to determine a scan area for a document to be scanned based upon the selected scaling value, wherein the scan area is different than an actual area of the document;
   a transparent platen;
   a scan area indicator comprising a first light source providing a visible indication of the scan area; and
   a carriage movable across the platen, wherein movement of the carriage repositions the visible indication, wherein the scan area indicator and the carriage are stationary when providing the visible indication of the scan area and wherein the scan area indicated by the scan area indicator is less than a total area of the platen, wherein the light source is configured to illuminate at least one distinct portion of the platen so as to indicate both a width and a length of the scan area, wherein the light source indicates a first width and a first length of a first scan area based upon a first selected scaling value and wherein the light source indicates a second width and a second length, different than the first width and the first length, respectively, of a second scan area based upon a second selected scaling value different than the first selected scaling value.

2. An apparatus comprising:
   a command interface configured to receive externally originating instructions including a selected scaling value;
   a controller configured to determine a scan area for a document to be scanned based upon the selected scaling value, wherein the scan area is different than an actual area of the document;
   a transparent platen;
   a scan area indicator providing a visible indication of the scan area;
   a carriage movable across the platen, wherein movement of the carriage repositions the visible indication, wherein the scan area indicator and the carriage are stationary when providing the visible indication of the scan area and wherein the scan area indicated by the scan area indicator is less than a total area of the platen, wherein the scan area indicator comprises a first light source and wherein the first light source is configured to illuminate at least one distinct portion of the platen indicating at least one dimension of the scan area; and
   one or more optical components between the first light source and the platen.

3. An apparatus comprising:
a command interface configured to receive externally originating instructions including a selected scaling value;
a controller configured to determine a scan area for a document to be scanned based upon the selected scaling value, wherein the scan area is different than an actual area of the document;
a transparent platen;
a scan area indicator providing a visible indication of the scan area;
a carriage movable across the platen, wherein movement of the carriage repositions the visible indication, wherein the scan area indicator and the carriage are stationary when providing the visible indication of the scan area and wherein the scan area indicated by the scan area indicator is less than a total area of the platen, wherein the scan area indicator comprises a first light source; and
an actuator configured to move the carriage, wherein the controller is configured to generate first control signals and second control signals, wherein the actuator, in response to the first control signals, moves the carriage to a stationary position such that the first light source forms an illumination at a location indicating at least one dimension of the scanning area and wherein the actuator, in response to the second control signals, moves the carriage during scanning of the document after receipt of a scan command.

4. The apparatus of claim 3 further comprising:
a lid;
a sensor configured to sense opening and closing of the lid with respect to the platen, wherein the controller generates the control signals in response to opening of the lid.

5. An apparatus comprising:
a command interface configured to receive externally originating instructions including a selected scaling value;
a controller configured to determine a scan area for a document to be scanned based upon the selected scaling value, wherein the scan area is different than an actual area of the document;
a transparent platen;
a scan area indicator providing a visible indication of the scan area; and
a carriage movable across the platen, wherein movement of the carriage repositions the visible indication, wherein the scan area indicator and the carriage are stationary when providing the visible indication of the scan area and wherein the scan area indicated by the scan area indicator is less than a total area of the platen, wherein the scan area indicator includes a light source and wherein the apparatus further comprises a mirror moved by the carriage relative to the scan area indicator, wherein the visible indication is reflected off the mirror onto the platen.

6. The apparatus of claim 5 further comprising an actuator to move the carriage during scanning of the document in response to receipt of a scan command.

* * * * *